(12) United States Patent
Oleinik et al.

(10) Patent No.: US 12,106,310 B2
(45) Date of Patent: Oct. 1, 2024

(54) AUTOMATED SOFTWARE SELECTION

(71) Applicant: T-Mobile USA, Inc., Bellevue, WA (US)

(72) Inventors: John Oleinik, Snohomish, WA (US);
Fred Wang, Bellevue, WA (US);
Tanmaya Gaur, Kirkland, WA (US);
Madhusri Movva, Redmond, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 415 days.

(21) Appl. No.: 17/385,720

(22) Filed: Jul. 26, 2021

(65) Prior Publication Data

US 2023/0025698 A1    Jan. 26, 2023

(51) Int. Cl.
| | |
|---|---|
| *G06Q 10/00* | (2023.01) |
| *G06N 20/00* | (2019.01) |
| *G06Q 10/10* | (2023.01) |
| *G06Q 30/016* | (2023.01) |

(52) U.S. Cl.
CPC .......... *G06Q 30/016* (2013.01); *G06N 20/00* (2019.01); *G06Q 10/10* (2013.01)

(58) Field of Classification Search
CPC ....... G06Q 30/016; G06Q 10/10; G06N 20/00
USPC .................. 705/1.1, 304; 707/722; 709/219; 715/738, 788; 717/113
See application file for complete search history.

(56) References Cited

U.S. PATENT DOCUMENTS

| | | | |
|---|---|---|---|
| 8,554,836 B1 * | 10/2013 | Wilson ............... | G06Q 30/0214 709/219 |
| 8,774,392 B2 | 7/2014 | Odinak et al. | |
| 8,917,860 B2 | 12/2014 | Duva et al. | |
| 9,264,545 B2 | 2/2016 | Odinak | |
| 9,413,892 B2 | 8/2016 | Coussement | |
| 9,495,881 B2 * | 11/2016 | Christmas ............. | G06F 3/0486 715/788 |
| 9,635,177 B1 | 4/2017 | Hoffberg | |
| 9,942,401 B2 | 4/2018 | Odinak et al. | |
| 2014/0189572 A1 * | 7/2014 | Martens ............. | G06Q 30/0261 715/780 |
| 2015/0310131 A1 * | 10/2015 | Greystoke .......... | G06Q 30/0619 707/722 |
| 2015/0339676 A1 * | 11/2015 | Tuchman ............. | G06K 7/1417 705/304 |

(Continued)

FOREIGN PATENT DOCUMENTS

WO    WO-2014116835 A2 *    7/2014    ........... G06F 16/958

*Primary Examiner* — Gabrielle A McCormick

(57) ABSTRACT

Methods, systems, and apparatus, including computer programs encoded on a computer storage medium, for automating software selection are disclosed. In one aspect, a method includes the actions of receiving, by a computing device, user interaction data that reflects an interaction between a first user and a second user. The actions further include receiving, by the computing device, user summary data that reflects characteristics of the first user. The actions further include, based on the user interaction data and the user summary data, determining, by the computing device, an application that is relevant to the interaction between the first user and the second user. The actions further include, based on determining the application that is relevant to the interaction between the first user and the second user, providing, for output to the second user, an interface of the application.

15 Claims, 3 Drawing Sheets

(56) References Cited

U.S. PATENT DOCUMENTS

2017/0329490 A1* 11/2017 Esinovskaya ....... G06F 3/04817
715/738
2019/0026676 A1   1/2019 Tamblyn et al.
2020/0159500 A1*  5/2020 Bodin ................. G06F 8/33
717/113
2020/0394590 A1* 12/2020 Kaimal ............. G06Q 30/0281

* cited by examiner

AUTOMATED SOFTWARE SELECTION

BACKGROUND

During a customer service interaction between a customer and a customer service agent, the agent may select various software modules that may assist the agent during the interaction. Some of the software modules may allow the agent to update the account profile of the customer, view financial information related to the customer's account, etc.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Providing efficient customer service can be challenging for any large company. A customer may call a customer service number, and an agent who may have been on the job for only a few weeks may answer the call. The customer expects the agent to address the customer's problem in a quick and efficient manner. In order to do so, the agent needs to be able to access a customer service system and sort through data related to the customer, identify the appropriate company policy, and determine an appropriate solution. This can be challenging when different portions of the customer's data are accessible through different applications or modules and when the company's policies are difficult to sort through.

It would be beneficial for the customer service system to be able automatically to identify and present a relevant application or module and a relevant company policy to the agent during the telephone call. The customer service system may analyze various factors to determine the appropriate application or module and policy. Those factors may include the transcriptions of the agent and the customer during the current call, transcriptions of the customer and other agents during any previous calls, the account activity of the customer, a tone of the agent and the customer, the agent's interactions with the customer service system, the length of the call, and/or any other similar factors. In the context of a telecommunications service provider, the factors may also include the call history of the customer, the data usage history of the customer, the type of equipment used by the customer, location data related to the customer's equipment, and/or any other similar telecommunications related factors.

The customer service system may process the data corresponding to these factors using various rules and/or machine learning models. The rules may specify how to compare the various factors and output data indicating which application or module and which policy to present to the agent. The models may be configured to receive the data corresponding to the factors and output data indicating an appropriate application or module and policy along with a confidence score that indicates the likelihood that the output is correct. After presenting the application or module and policy to the agent, the customer service system may continue to monitor the call and update the application or module and policy presented to the agent. Based on the interactions, the customer service system may retrain the models and update the rules in order to provide more accurate suggestions in the future.

Figure 1:
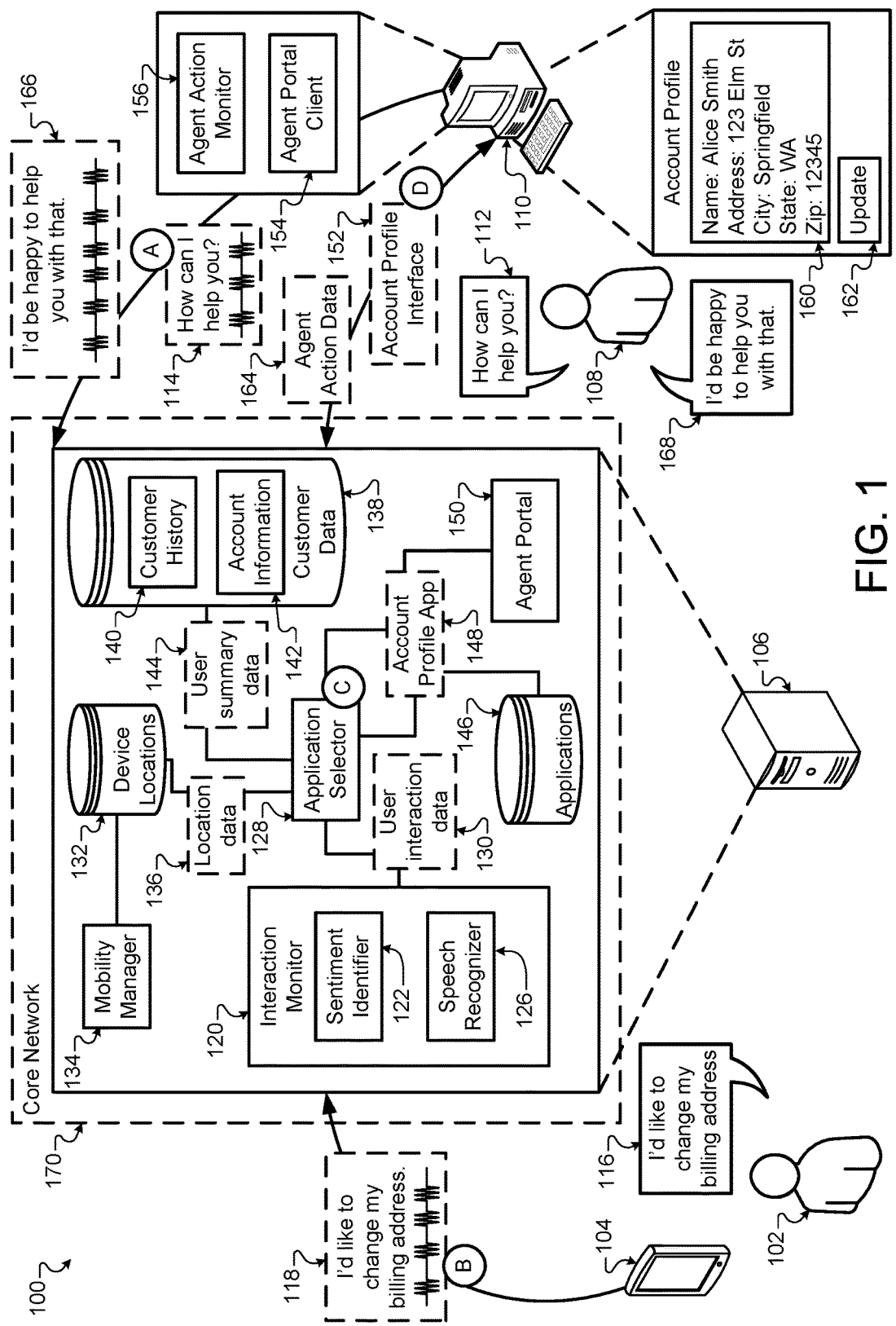
FIG. 1 illustrates an example system that is configured to select software to present to a user based on an interaction between that user and another user.

FIG. 1 illustrates an example system 100 that is configured to select software to present to a second user 108 based on an interaction between the second user 108 and the first user 102. Briefly, and as described in more detail below, the system 100 includes a server 106 that is configured to analyze interaction data that reflects the interaction between the first user 102 and the second user 108. Based on the interaction data and any additional data, the system 100 may automatically select an application to present to the second user 108. The application may be relevant to the interaction between the first user 102 and the second user 108 and may assist the second user 108 in addressing the requests of the first user 102. FIG. 1 includes various stages A through E that may illustrate the performance of actions and/or the movement of data between various components of the server 106 and/or between the server 106 and other computing devices 104 and 110. The system 100 may perform these stages in any order.

In more detail, the first user 102 may be a customer who is communicating with the second user 108 who is a customer service agent working at a customer service center. The first user 102 and the second user 108 may be communicating over a voice interface, a text-based interface, and/or a video interface. In some instances, the first user 102 may be a customer of a wireless carrier and the second user 108 may be a customer service agent of the wireless carrier. The second user 108 may interact with the computing device 110 to access information related to the first user 102. The computing device 110 may communicate with the server 106 to access the information related to the first user 102. The computing device 110 and the server 106 may include various applications that are configured to access information related to the first user 102 and other users.

In stage A, the first user 102 may use the computing device 104 to contact a customer service center. The computing device 104 may be any type of computing device that is configured to communicate with other computing devices. For example, the computing device 104 may be mobile phone, tablet, laptop computer, desktop computer, smart watch, or any other similar type of device. The first user 102 may place a telephone call to the customer service center, initiate a chat session with the customer service center through a messaging application, place a video call to the customer service center, and/or any other similar communication technique. The second user 102 may respond to the communication request using the computing device 110. The computing device 110 may be any type of type of computing device that is configured to communicate with other computing devices. For example, the computing device 104 may be a mobile phone, tablet, laptop computer, desktop computer, smart watch, or any other similar type of device.

In the example of FIG. 1, the first user 102 may place a telephone call to the customer service center using the computing device 104. The second user 108 may answer the telephone call using the computing device 110 and speak the utterance 112, "How can I help you?" The computing device 110 detects the utterance 112 using an audio input device such as a microphone. The computing device 110 may process the audio of the utterance 112 using an audio subsystem that may include an analog to digital converter, a buffer, and/or any additional audio processing hardware or software. The computing device 110 may generate the audio data 114 that encodes the utterance. The computing device 110 may provide the audio data 114 to the server 106. The server 106 may provide the audio data 114 to the computing device 104. In some instances, the computing device 110 may provide the audio data 114 to an additional computing device that provides the audio data 114 to the computing device 104.

The computing device 104 receives the audio data 114 and outputs the audio data 114 through an audio output device such as a speaker. The first user 102 may hear, "How can I help you?" In stage B, the first user 102 may respond to the audio data 114 by speaking the utterance 116, "I'd like to change my billing address." The computing device 104 detects the utterance 116 using an audio input device such as a microphone. The computing device 104 may process the audio of the utterance 116 using an audio subsystem that may include an analog to digital converter, a buffer, and/or any additional audio processing hardware or software. The computing device 104 may generate the audio data 118 that encodes the utterance 116. The computing device 104 may provide the audio data 118 to the server 106. The server 106 may provide the audio data 118 to the computing device 110. In some instances, the computing device 104 may provide the audio data 118 to an additional computing device that provides the audio data 118 to the computing device 110.

The server 106 may be included in or in communication with a network such as a wireless carrier network that provides voice and data communication services to multiple devices, such as the computing devices 104 and 110 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104 and 110 and other devices using a Wi-Fi network, short range radio, infrared communication, and/or any other similar communication technique.

The wireless carrier network may include a radio access network and a core network 170. The radio access network may include multiple base stations. The multiple base stations are responsible for handling voice and/or data traffic between multiple devices, such as the computing devices 104 and 110 and other devices and the core network 170. Accordingly, each of the base stations may provide a corresponding network cell that delivers telecommunication and data communication coverage. The core network 170 may use the network cells to provide communication services to the multiple subscriber devices. For example, the core network 170 may connect the multiple devices to other telecommunication and data communication networks, such as the Internet and the public switched telephone network (PSTN). The base stations are responsible handling voice and data traffic between devices and the core network 170. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The server 106 may include an application selector 128 that is configured to select an application to assist the second user 108 in the interaction with the first user 102. The application selector 128 may receive user interaction data 130 from the interaction monitor 120. The user interaction data 130 may describe the interaction between the first user 102 and the second user 108 by including a transcription of the interaction, sentiments of the first user 102 and/or the second user 108, data identifying the first user 102 and/or the second user 108, and/or any additional information. The interaction monitor 120 may be configured to monitor the audio data 114, the audio data 118, and/or any additional communication data exchanged between the first user 102 and the second user 108. The additional communication data may include text-based communications, video communications, and/or any other similar type of communications.

The interaction monitor 120 may include a sentiment identifier 122 and/or a speech recognizer 126. The speech recognizer 126 may be configured to analyze the audio data 114, the audio data 118, and additional audio data and generate a transcription of the audio data. The transcription may include additional information such as the identity of the speaker that corresponds to different utterances, a timestamp of each utterance, and/or confidence scores. The confidence scores may reflect a likelihood that the corresponding transcription matches what the user said. In some implementations, the speech recognizer 126 may use a combination of acoustic models and language models to determine the transcription. In some implementations, the speech recognizer 126 may use speech recognition models trained using machine learning to generate transcriptions of the audio data. In instances where the communication between the first user 102 and the second user 108 is text-based, the speech recognizer 126 may add the identity of the writer and/or a timestamp of the message to the communication text.

The sentiment identifier 122 may be configured to determine a sentiment of the first user 102 and/or the second user 108. The sentiment identifier 122 may analyze the audio data 114, the audio data 118, and/or additional audio data and determine various characteristics of the speech of the first user 102 and the speech of the second user 108. These speech characteristics may include the loudness, pitch, cadence, intonation, intensity of overtones, speech flow, rhythm, tempo, inflections, and/or any other similar speech characteristics. The sentiment identifier 122 may use various models, rules, and/or algorithms encoded in software to determine the speech characteristics. In some implementations, the sentiment identifier 122 may determine a value for each speech characteristic for each utterance. For example, the sentiment identifier 122 may determine speech characteristics of the audio data 118 and the audio data 114. Based on the characteristics of one or more of a user's utterances, the sentiment identifier 122 may determine the sentiment of the first user 102 and/or the sentiment of the second user 108. The sentiment may indicate whether a user is angry, frustrated, content, confused, and/or any other sentiment. For example, the sentiment identifier 122 may determine that a user is likely confused if the pitch of the speech of the user increases at the end of an utterance. As another example, the sentiment identifier 122 may determine that a user is likely angry if the loudness of a subsequent utterance of a user is a threshold higher than an initial utterance of the user. In some implementations, the sentiment identifier 122 may generate a confidence score that indicates a likelihood that the identified sentiment matches the sentiment of the respective user.

In some implementations, the sentiment identifier 122 uses a combination of the audio data and the corresponding transcription to determine the speech characteristics and the sentiment of the user. For example, the sentiment identifier 122 may receive the transcription of the audio data 118 from the speech recognizer 126 and the audio data 118 from the computing device 104. Based on the audio data 118, the sentiment identifier 122 may determine speech characteristics of the user 102 while speaking the utterance 116. Based on the speech characteristics and/or the transcription, the sentiment identifier 122 may determine the sentiment of the user 102 while speaking the utterance 116. For example, if the utterances of the first user 102 begin with words such as who, what, when, where, how, or why, then the sentiment identifier 122 may determine that the first user 102 is likely confused. The sentiment identifier 122 may receive additional audio data that encodes additional speech of the first user 102 and determine an additional sentiment of the first user 102 or update the sentiment that reflects the sentiment of the first user 102.

The interaction monitor 120 may generate the user interaction data 130 that includes the sentiment of the first user 102, the sentiment of the second user 108, and/or the transcription of the communication between the first user 102 and the second user 108. The user interaction data 130 may also include data identifying the first user 102 and/or the second user 108. This identifying data may include a phone number, email address, messaging application username, and/or any other unique identifier. In some instances, the identifying data may identify the computing device 104 and/or the computing device 110 using an identify such as an international mobile equipment identity, international mobile subscriber identity, media access control address, and/or any other similar identifier. The interaction monitor 120 may provide the user interaction data 130 to the application selector 128. In some implementations, the user interaction data 130 may include a sentiment confidence score that reflects the likelihood that sentiments of the first user 102 or the second user 108 match the sentiments of the first user 102 or the second user 108. In some implementations, the interaction monitor 120 may generate a model that is configured to determine the sentiment of a user by training the model using machine learning and prior sentiments and corresponding audio data, transcriptions, and/or speech characteristics. In some implementations, the user interaction data 130 may include a transcription confidence score that reflects the likelihood that the transcription matches that of the first user 102 and the second user 102 said.

The server 106 may include a mobility manager 134 that is configured to store the location data in the device locations 132. The mobility manager 134 may be configured to monitor the location of the computing devices 104 and/or 110 that are connected to the server 106 through a wireless base station. The location of the computing devices 104 and/or 110 may include the location of the wireless base station to which the computing devices 104 and/or 110 are connected and/or GPS data received from the computing devices 104 and/or 110.

In some implementations, the mobility manager 134 may determine the location of the computing devices 104 and/or 110 at periodic intervals, such as every five seconds. In some implementations, the mobility manager 134 may determine the location of the computing devices 104 and/or 110 when the computing devices 104 and/or 110 connect to a different wireless base station and/or provide updated GPS data. In some implementations, the mobility manager 134 may determine the location of the computing devices 104 and/or 110 relative to the base station with which the computing device is communicating. In this case, the mobility manager 134 may determine the relative location based on data collected from the base station such as signal strength and direction of communications between the computing devices 104 and/or 110 and the base station. The mobility manager 134 may also determine the relative location based on the location of the base station and GPS data received from the computing devices 104 and/or 110. The relative location data may include a distance between the computing devices 104 and/or 110 and the base station, the cardinal direction from the base station to the computing devices 104 and/or 110, and/or any other similar measurements.

The application selector 128 may receive the location data 136 from the device locations 132. The location data 136 may include the geographic locations of the computing device 104 and/or the computing device 110. The location data 136 may include a time period that the computing device 104 and/or the computing device 110 have been at the locations identified in the location data 136. In some implementations, the application selector 128 may receive the user interaction data 130 that includes data identifying the first user 102 and/or the second user 108 and/or data identifying the computing device 104 and/or the computing device 110. The application selector 128 may access, from the device locations 132, the location data 136 that corresponds to the data identifying the first user 102 and/or the second user 108 and/or data identifying the computing device 104 and/or the computing device 110.

The server 106 may include the customer data 138. The customer data 138 may include customer history 140 and account information 142. The customer history 140 may include data related to users' previous interactions with the customer service center. For example, the customer history 140 may include user interaction data from previous interactions, location data that indicated where the participants of the interactions where located, timestamps of the previous interactions, length of the previous interactions, and/or any other similar information. The account information 142 may include data related to the account of the first user 102 and other users with the wireless carrier or other entity that operates the customer service center. The account information 142 may include billing details related to the users, data usage of the users, previous telephone calls of the users, lengths and times of the previous telephone calls, other computing devices on users' accounts, financial data related to the accounts, and/or any other similar account details.

The application selector 128 may receive the user summary data 144 from the customer data 138. The application selector 128 may request the user summary data 144 by providing the customer data 138 with data identifying the first user 102 and/or the second user 108 and/or data identifying the computing device 104 and/or the computing device 110. The application selector 128 may request the user summary data 144 in response to receiving the user interaction data 130. The application selector 128 may receive the user summary data 144 that includes the customer history of the first user 102 and the customer history of the second user 108. The customer history of the first user 102 may include the user interaction data from the interactions of the first user 102 with other customer service agents similar to the second user 108, timestamps of the previous interactions, length of the previous interactions, location data indicating where the first user 102 and the other customer service agents were located during the interactions, and/or any other similar information. The customer history of the second user 108 may include user interaction data from the interactions of the second user 108 with other customers similar to the first user 102, timestamps of the previous interactions, length of the previous interactions, location data indicating where the second user 108 and the other customers were located during the interactions, and/or any other similar information.

The application selector 128 may receive the account information of the first user 102. The account information of the first user 102 may include the billing details of the first user 102, the data usage of the first user 102, the previous telephone calls of the first user 102, the lengths and times of those previous telephone calls, data identifying the other computing devices on the account of the first user 102, financial data related to the account of the first user 102, and/or any other similar account details.

The application selector 128 may analyze the user interaction data 130, the location data 136, and/or the user summary data 144. Based on analyzing the user interaction data 130, the location data 136, and/or the user summary data 144, the application selector 128 selects an application from among the applications 146 that is configured to assist the second user 108 with the interaction with the first user 102. The application selector 128 may use various rules and/or models that are configured to identify one or more applications to assist the second user 108. The various rules may specify how to compare the user interaction data 130, the location data 136, and/or the user summary data 144 to determine which applications would assist the second user 108 during the interaction. The application selector 128 may use various models that are configured to receive the user interaction data 130, the location data 136, and/or the user summary data 144 as inputs. The models may be trained using machine learning and may be configured to output data identifying one or more applications that may assist the second user during the interaction.

In stage C, the application selector may analyze the user interaction data 130, the location data 136, and/or the user summary data 144. As identified by the speech recognizer 126, the interaction data 130 may include data indicating that the first user 102 requested to change the billing address. The application selector 128 may apply a rule that indicates if the interaction data 130 includes a request to change an address (as also identified by the speech recognizer 126), then the application selector 128 should select the account profile application 148 to obtain access to the first user's account profile, which stores the first user's billing address information. The application selector 128 may provide data identifying the account profile application 148 to the agent portal 150. In this case, the agent portal 150 may be able to access the account profile application 148 from the applications 146 and/or provide data to the agent portal client 154 so the agent portal client 154 can access data related to the account profile application 148 from the applications 146. In some implementations, the application selector 128 may provide the account profile application 148 to the agent portal 150.

The agent portal 150 may be configured to generate and provide an interface to the computing device 110. The agent portal 150 may communicate with the agent portal client 154 on the computing device 110. The agent portal 150 may access the applications 146 and generate an interface that includes applications selected by the application selector 128. The agent portal 150 may provide that interface to the agent portal client 154, and the agent portal client 154 may output the interface on a display of the computing device 110.

In the example of FIG. 1 and in stage D, the application selector 128 may automatically, and without receiving a request from the second user 108, select and cause to open the account profile application 148. The application selector 128 may provide an indication to the agent portal of the selection of the account profile application 148. The agent portal 150 may automatically, and without receiving a request from the second user 108, generate an account profile interface 152 of the account profile application 148. The agent portal 150 may access the customer data 138 for the first user 102 and populate the various fields of the account profile application 148 in the account profile interface 152 with the user data. The agent portal client 154 may receive the account profile interface 152 and output the account profile interface 152 on the display of the computing device 110.

The account profile interface 152 may include account profile data 160 related to the first user. For example, the account profile data 160 may include the name and address of the first user 102. The account profile interface 152 may also include a selectable button 162 to update the account profile data 160. The second user 108 may select the button 162 and enter the updated user data into the account profile data 160 on the account profile interface 152. The agent client portal 154 may provide the updated user data to the agent portal 150. The agent portal 150 may update the customer data 138 to include the updated user data provided by the second user 108. In some implementations, the application selector 128 may be configured to identify a user request in the transcription of the user interaction data 130. The application selector 128 may be configured to implement the user request in the user summary data 144 and provide an indication of the update in the account profile application 148 provided to the agent portal 150. In this case, the second user 108 may view and edit and/or approve the update provided by the application selector 144. In some implementations, application selector 128 may automatically implement the user request without the second user 108.

The application selector 128 may be configured to continuously receive additional user interaction data 130, location data 136, and/or user summary data 144 and update the selected applications for presentation to the second user 108. As the interaction between the first user 102 and the second user 108 continues, the first user 102 and/or the second user 108 may speak additional utterances. The application selector 128 may receive additional user interaction data 130 related to those utterances and update the application selection, if necessary.

In the example of FIG. 1, the application selector 128 may select the account profile application 148 based on the location data 136, the user summary data 144, and the user interaction data 130, which is based on the utterances 112 and 116. The location data 136 and the user summary data 144 may remain unchanged during the interaction between the first user 102 and the second user 108. The interaction monitor 120 may continue to monitor the interaction between the first user 102 and the second user 108.

The interaction between the first user 102 and the second user 108 may continue with the second user 108 speaking the utterance 168, "I'd be happy to help you with that." The second user 108 may speak the utterance 168 during or after the application selector 128 selects the account profile application and/or the computing device 110 displays the account profile interface 152. The computing device 110 may detect the utterance 168 through the audio input device and provide the audio data 166 to the server 106. The interaction monitor 120 may receive and analyze the audio data 166 using the sentiment identifier 122 and the speech recognizer 126. The interaction monitor 166 may provide additional user interaction data 130 to the application selector 128. The additional user interaction data 130 may reflect the utterance 168 or reflect the interaction between the first user 102 and the second user 108 up to that point, which may include the utterances 112, 116, and 168.

The application selector 128 may receive the additional user interaction data 130. The application selector 128 may analyze the additional user interaction data 130, the location data 136, and the user summary data 144 in in a similar manner as described above. The application selector 128 may select an additional application to assist the second user 108 during the interaction and/or determine that the account profile application 148 is not helpful to the second user 108. In some instances, the application selector 128 may determine to not make any changes to the selected applications. For example, the application selector 128 may determine to maintain the account profile application as the application to provide to the second user 148.

The computing device 110 may include an agent action monitor 156. The agent action monitor 156 may be configured to monitor how the second user 108 interacts with the account profile interface 152 or whatever application the agent portal client 154 is providing for output to the display of the computing device 110 and/or for execution in the background of the computing device 110. The agent action monitor 156 may monitor the movement of the cursor computing device. In some instances, the computing device 110 may include a camera that allows the agent action monitor 156 to track the eye movement of the second user 108. The agent action monitor 156 may monitor the keystrokes of the second user 108. The agent action monitor 156 may monitor the audio detected by the audio input device of the computing device 110.

The agent action monitor 156 may generate the agent action data 164. The agent action data 164 may include the cursor movement, eye movement, keystrokes, and/or audio data based on the interaction between the second user 108 and the computing device 110. The application selector 128 may receive the agent action data 164.

The application selector 128 may analyze the agent action data 164, the user interaction data 130, the location data 136, and the user summary data 144 using various rules and/or models. The rules may specify how to analyze the agent action data 164, the user interaction data 130, the location data 136, and/or the user summary data 144. Based on that comparison, the rule may specify to add an application and/or remove an application. The rule may specify to maintain the application(s) provided to the second user 108. The models may be configured to receive the agent action data 164, the user interaction data 130, the location data 136, and/or the user summary data 144 and output data indicating whether to add an application and/or remove an application or maintain the application(s) provided to the second user 108.

The second user 108 may interact with the account profile interface 152. The second user 108 may change the address information 160 based on the request from the first user 102. The second user 108 may select the update button 162. In response to the selection of the update button 162, the agent portal client 154 of the computing device 110 may provide updated account profile data to the server 106. The server 106 may update the account information 142 of the customer data 138 based on the updated account profile data. The server 106 may also update the customer history 140 of the customer data 138 to include data related to the interaction between the first user 102 and the second user 108. The data related to the interaction between the first user 102 and the second user 108 may include a transcription of the utterances 112, 116, and 168, the locations of the computing devices 104 and 110, timestamps of the interaction, the length of the interaction, sentiments of the first user 102 and/or the second user 108, data indicating whether any requests of the first user 102 were satisfied, the current account data of the first user 102, and/or any other similar information. The application selector 128 may use the updated customer history 140 of the first user 102 for subsequent interactions between the first user 102 and the second user 108 or other similar users.

Figure 2:
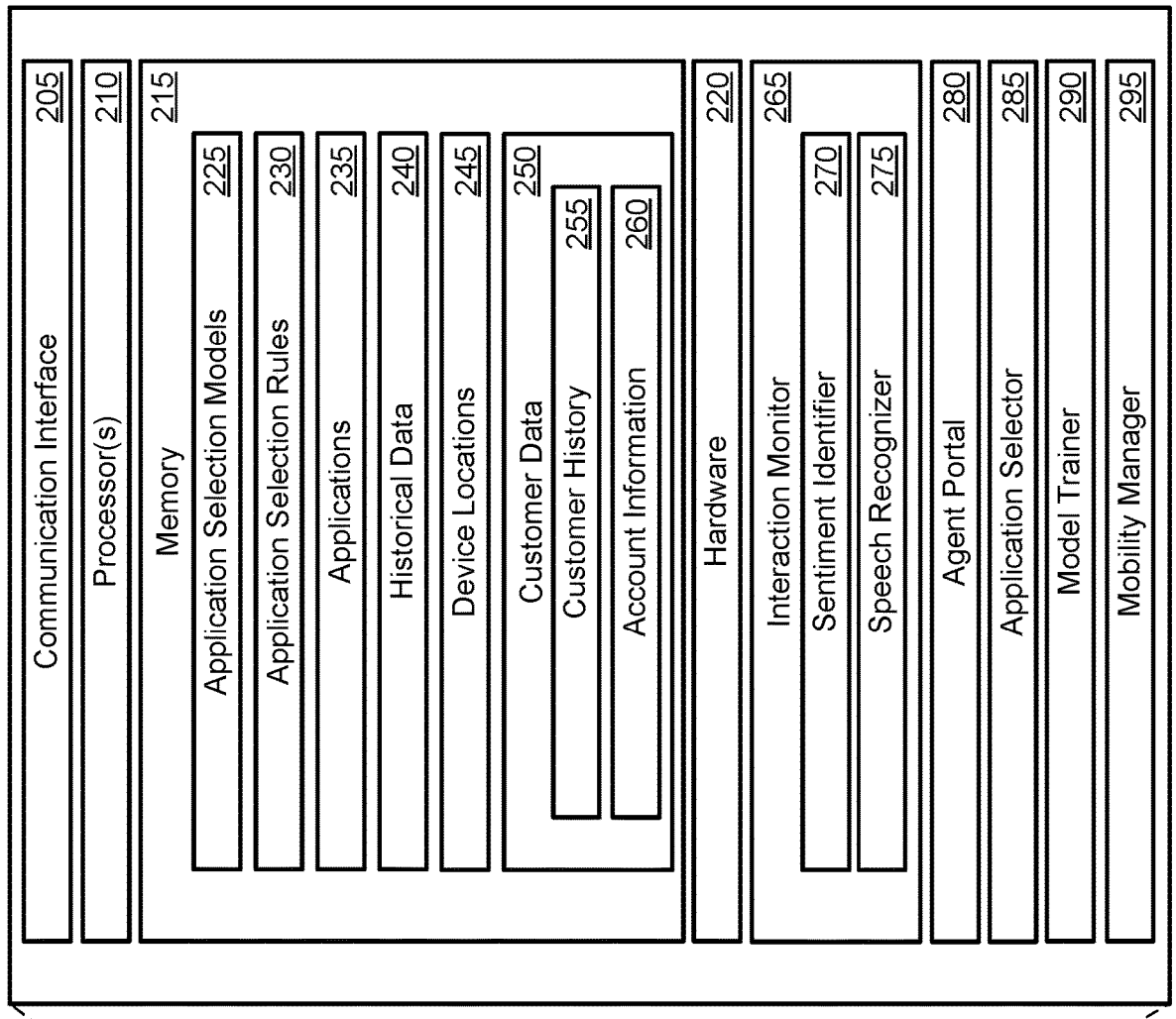
FIG. 2 illustrates an example server that is configured to select software to present to a user based on an interaction between that user and another user.
Figure 2:
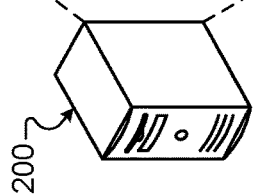

FIG. 2 illustrates an example server 200 that is configured to select software to present to a user based on an interaction between that user and another user. The server 200 may be any type of computing device that is configured to communicate with other computing devices. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement an interaction monitor 265. The interaction monitor 265 may be similar to the interaction monitor 120 of FIG. 1. The interaction monitor 265 may be configured to monitor an interaction between users. The interaction may be audio-based, text-based, and/or video-based. The interaction monitor 265 may generate user interaction data that describes various characteristics of the interaction between the users. The interaction monitor 265 may include a sentiment identifier 270 that is configured to determine the sentiment of one or more of the users participating in the interaction. The interaction monitor 265 may include a speech recognizer 275 that is configured to transcribe audio data of the interaction between the users.

The speech recognizer 275 may be configured to analyze the audio data exchanged between the users of the interaction and any additional audio data and generate a transcription of the audio data. The transcription may include additional information such as the identity of the speaker, a timestamp of the utterance, and/or a confidence score. The identity of the speaker may be specify whether a portion of the transcription was spoken by the first user who spoke, the second user who spoke, etc. The confidence score may reflect a likelihood that the corresponding transcription matches that the user said. In some implementations, the speech recognizer 275 may use a combination of acoustic models and language models to determine the transcription. In some implementations, the speech recognizer 275 may use speech recognition models trained using machine learning to generate transcriptions of the audio data. In instances where the communication between the users is text-based, the speech recognizer 275 may add the identity of the writer and/or a timestamp of the message to the communication text.

The sentiment identifier 270 may be configured to determine a sentiment of one or more of the users and/or the combined sentiment of the users. The sentiment identifier 270 may analyze the audio data of the users' utterances and determine various characteristics of the speech of the users. The characteristics may include the loudness, pitch, cadence, intonation, intensity of overtones, speech flow, rhythm, tempo, inflections, and/or any other similar speech characteristics. The sentiment identifier 270 may use various models, rules, and/or algorithms encoded in software to determine the speech characteristics. In some implementations, the sentiment identifier 270 may determine value for each characteristic for each utterance. For example, the sentiment identifier 270 may determine the loudness, pitch, cadence, intonation, intensity of overtones, speech flow, rhythm, tempo, and/or inflections for the audio data of the users' utterances. Based on the characteristics of one or more of the users' utterances, the sentiment identifier 270 may determine the sentiment of one or more of the users or a combined sentiment. The sentiment may indicate whether a user is angry, frustrated, content, confused, and/or any other sentiment. In some implementations, the sentiment identifier 270 may generate a confidence score that indicates a likelihood that the identified sentiment matches the sentiment of the user.

In some implementations, the sentiment identifier 270 uses a combination of the audio data and the corresponding transcription to determine the speech characteristics and the sentiment of the user. For example, the sentiment identifier 270 may receive transcriptions of audio data from the speech recognizer 275. Based on the audio data and the transcription of the audio data, the sentiment identifier 270 may determine speech characteristics of the various users. The sentiment identifier 270 may receive additional audio data that encodes additional speech of the users and determine an additional sentiment of the users or update the sentiment that reflects the sentiment of the users.

The interaction monitor 265 may generate user interaction data that includes the sentiments of the users and/or the transcription of the communication between the users. The user interaction data may also include data identifying the users. This identifying data may include a phone number, email address, messaging application username, and/or any other unique identifier. In some instances, the identifying data may identify the computing devices used by the users using an identify such as an international mobile equipment identity, international mobile subscriber identity, media access control address, and/or any other similar identifier. The interaction monitor 265 may provide the user interaction data to the application selector 285. In some implementations, the user interaction data may include a sentiment confidence score that reflects the likelihood that identified sentiments match the sentiments of the users. In some implementations, the interaction monitor 265 may generate a model that is configured to determine the sentiment of a user by training the model using machine learning and prior sentiments and corresponding audio data, transcriptions, and/or speech characteristics. The historical data 240 may include the prior sentiments and corresponding audio data, transcriptions, and/or speech characteristics. In some implementations, the user interaction data may include a transcription confidence score that reflects the likelihood that the transcription matches what the users said.

The one or more processors 210 may implement a mobility manager 295. The mobility manager 295 may be similar to the mobility manager 134 of FIG. 1. The mobility manager 295 may monitor the locations of the computing devices of the user and other computing devices communicating with the server 200. The mobility manager 295 may be configured to monitor the location of a computing device that is connected to the server 200 through a wireless base station. The location of the computing device may include the location of the wireless base station to which the computing device is connected and/or GPS data received from the computing device. The mobility manager 295 may store data indicating the locations of the computing devices in the device locations 245 and times when the computing devices were at the identified locations.

In some implementations, the mobility manager 295 may determine the location of a computing device at periodic intervals, such as every five seconds. In some implementations, the mobility manager 295 may determine the location of a computing device when the computing device connects to a different wireless base station and/or provides updated GPS data. In some implementations, the mobility manager 295 may determine the location of the computing device relative to the base station with which the computing device is communicating. In this case, the mobility manager 295 may determine the relative location based on data collected from the base station such as signal strength and direction of communications between the computing device and the base station. The mobility manager 295 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement an application selector 285. The application selector 285 may be similar to the application selector 128 of FIG. 1. The application selector 285 may be configured to select an application to assist a user in the interaction among the users. The application selector 285 may receive user interaction data from the interaction monitor 265. The user interaction data may describe the interaction between the users by including a transcription of the interaction, sentiments of the users, data identifying the users, and/or any additional information. The interaction monitor 265 may be configured to monitor the communication data exchanged among the users. The communication data may include text-based communications, video communications, and/or any other similar type of communications.

The application selector 285 may receive the location data from the device locations 245. The location data may include the geographic locations of the computing devices of the users. The location data may include a time period that the computing devices have been at the locations identified in the location data. In some implementations, the application selector 285 may receive the user interaction data that includes data identifying the users and/or data identifying the computing devices. The application selector 285 may access, from the device locations 245, the location data that corresponds to the data identifying the users and/or data identifying the computing devices of the users.

The memory 215 may store the customer data 250 that may include the customer history 255 and the account information 260. The customer data 250, the customer history 255, and the account information 260 may be similar to the customer data 138, the customer history 140, and the account information 142 of FIG. 1, respectively. The customer history 255 may include data related to users' previous interactions with the customer service center. For example, the customer history 255 may include user interaction data from previous interactions, location data that indicated where the participants of the interactions where located, timestamps of the previous interactions, length of the previous interactions, and/or any other similar information. The account information 260 may include data related to the account of the users of the wireless carrier or other entity that operates the customer service center. The account information 260 may include billing details related to the users, data usage of the users, previous telephone calls of the users, lengths and times of the previous telephone calls, other computing devices on users' accounts, financial data related to the accounts, and/or any other similar account details.

The application selector 285 may receive user summary data from the customer data 250. The application selector 285 may request the user summary data by providing the customer data 250 with data identifying a user, data identifying a computing device of the user, data identifying another user with whom the user is interacting, and/or data identifying a computing device of that other user. The application selector 285 may receive the user summary data that includes the customer history of the user and/or the other user with whom the user is interacting. The customer history of the user may include the user interaction data from the interactions of the user with other customer service agents similar to the other user, timestamps of the previous interactions, length of the previous interactions, location data indicating where the user and the other users were located during the interactions, and/or any other similar information. The customer history of the other user may include user interaction data from the interactions of the other user with other customers or users similar to the user, timestamps of the previous interactions, length of the previous interactions, location data indicating where the other user and the customers or users were located during the interactions, and/or any other similar information.

The application selector 285 may receive the account information of the user. The account information may include the billing details of the user, the data usage of the user, the previous telephone calls of the user, the lengths and times of those previous telephone calls, data identifying the other computing devices on the account of the user, financial data related to the account of the user, data identifying the period of time that the user has been a customer, payment information of the user, and/or any other similar account details.

The application selector 285 may receive agent action data from a computing device of a user. The agent action data may include the cursor movement, eye movement, keystrokes, and/or audio data based on the interaction between the user and the computing device of the user. The agent action data may include data indicating the applications that the computing device is displaying to the user. The applications may include those selected by the application selector 285 and/or selected by the user. In some instances, agent action data may include the interactions of one of the users with the computing device of that user. That user may be the one who is interacting with the application selected by the application selector 285.

The application selector 285 may analyze the user interaction data, the location data, the agent action data, and/or the user summary data. Based on analyzing the user interaction data, the location data, the agent action data, and/or the user summary data, the application selector 285 selects an application from among the applications 235 that is configured to assist a user with the interaction with the other user. The application selector 285 may use the application selection models 225 and/or the application selection rules 230 that are configured to identify one or more applications to assist the user. The application selection rules 230 may specify how to compare the user interaction data, the location data, the agent action data, and/or the user summary data to determine which applications would assist the user during the interaction. The application selector 285 may use the application selection models 225 that are configured to receive the user interaction data, the location data, the agent action data, and/or the user summary data as inputs. The application selection models 225 may be trained using machine learning and may be configured to output data identifying one or more applications that may assist the user during the interaction.

The one or more processors 210 may implement a model trainer 290. The model trainer 290 may be configured to generate the application selection rules 230 and train the application selection models 225 using the historical data 240. The historical data 240 may include data related to previous interactions between users. The historical data 240 may include interactions between agents of the same customer service center and the various users who interact with the customer service center. The historical data 240 for an interaction between a user and an agent of the customer service center may include the audio data of speech of the user and/or the agent, the transcription of the speech of the user and/or the agent, the transcription confidence score that the transcription matches the audio data, the sentiment of the user and/or agent, the sentiment confidence score that the sentiment matches that of the user and/or agent, the location of the computing devices of the user and/or agent, the user summary data of the user, agent action data, data identifying the applications that the computing device of the agent is presenting to the agent, data indicating whether the agent selected an application or a computing device automatically selected an application, and/or any other similar data. The user summary data may include account information of the user and the customer history of the user. The agent action data may include the interactions between the agent and the applications, such as cursor movement, eye movement, keystrokes, and/or any other similar interaction. The historical data 240 for an interaction may also include the loudness, pitch, cadence, intonation, intensity of overtones, speech flow, rhythm, tempo, inflections, and/or any other similar speech characteristics of the speech of the user and/or the agent. In some instances, transcription confidence scores or sentiment confidence scores of 1.0 may indicate a confirmed transcription or sentiment. The agent, the user, or a third-party may confirm the sentiment or transcription.

In some implementations, the application selection rules 230 may be predetermined, by, for example, an operator or owner of the server 200. A predetermine application selection rule may specify a scenario where the operator or owner of the server 200 indicates a specific outcome if the user interaction data, the location data, the agent action data, and/or the user summary data includes a particular situation or scenario. For example, a predetermined application selection rule may indicate that if the user interaction data indicates that the user wishes to add a service and the user summary data indicates that the user is at least two months behind on payments, then the predetermined application selection rule may not select the service selection application because the user is not able to add additional services if the user is at least two months behind on payments. The predetermined application selection rule may select a payment application that assists the agent in processing a payment from the user.

The model trainer 290 may analyze the historical data 240 for patterns that indicate which applications are relevant to the interaction. If the model trainer 290 determines that a particular pattern in the historical data 240 corresponds to the agent interacting with an application, then the model trainer 290 may generate an application selection rule 230. For example, the model trainer 290 may determine that patterns in the transcriptions, such as the customer speaking the terms "update" and "address" in the same utterance," correspond to the agent interacting with an account profile application. In this case, the model trainer 290 may generate an application selection rule 230 that indicates that if the customer speaks the terms "update" and "address" in the same utterance, then the application selector 285 should select the account profile application. As another example, the model trainer 290 may determine that when the sentiment of the customer is "angry," the agent is interacting with a pricing application. In this case, the model trainer 290 may generate an application selection rule 230 that indicates that if the sentiment of the customer is "angry," then the application selector 285 should select the pricing application.

The model trainer 290 may generate data samples based on the historical data 240. The model trainer 290 may use the data samples to train the application selection models 225 using machine learning. The application selection models 225 may be configured to receive various combinations of data that is similar to data included in the data samples and output data identifying an application to present to the agent to assist in the interaction with the user. In some instances, the application selection models 225 may output an application selection confidence score that reflects a likelihood that the identified application is an application that will assist the agent in the interaction with the user.

The data samples may represent a snapshot of each interaction at various points in time. For a particular interaction, the historical data 240 may include user interaction data, location data, user summary data, and data identifying applications presented to the agent. The location data may not change during the interaction. The user summary data may change during the interaction when the agent updates the account information. The user interaction data may change as the user and the agent speak during the interaction. The data identifying applications presented to the agent may change during the interaction. The user interaction data, the location data, the user summary data, and the data identifying applications presented to the agent may include timestamps that allow the model trainer 290 to correlate the user interaction data, the location data, and the user summary data. The model trainer 290 may generate a data sample that represents the beginning of the interaction. That data sample may include the location data, the user summary data before the user and the agent began speaking, and the data identifying applications presented to the agent at the beginning of the interaction. The model trainer 290 may generate a second data sample that represents the interaction after the first utterance, whether spoken by the user or the agent. That data sample may include the same location data, the same user summary data, user interaction data that represents the interaction after the first utterance, and data identifying applications presented to the agent after the first utterance. The model trainer 290 may continue generating data samples that include the same location data, the same user summary data, user interaction data that represents the interaction after different utterances, and data identifying applications presented to the agent after the utterances. During the interaction, the agent may update the user summary data. The model trainer 290 may generate data samples that include the same location data, the updated user summary data, user interaction that represents the interaction after the utterances spoken after the updating of the user summary data, and data identifying applications presented to the agent after the utterances spoken after the updating of the user summary data.

The model trainer 290 may generate additional data samples from different interactions in a similar manner based on user interaction data, location data, user summary data, and data identifying the applications presented to the agent. Some interactions may also include agent action data. The agent action data may also include timestamps that allow the model trainer 290 to include the agent action data in the various data samples. The model trainer 290 may group the data samples that include similar type of data. Some data samples may include user interaction data, user summary data, and data identifying the applications presented to the agent. The model trainer 290 may use those data samples to train, using machine learning, a model that is configured to receive user interaction data and user summary data and output data identifying one or more applications to present to the agent. Other data samples may include user interaction data, user summary data, location data, agent action data, and data identifying the applications presented to the agent. The model trainer 290 may use those data samples to train, using machine learning, a model that is configured to receive user interaction data, location data, agent action data, and user summary data and output data identifying one or more applications to present to the agent. The model trainer 290 may store the trained models in the application selection models 225.

The one or more processors 210 may implement an agent portal 280. The agent portal 280 may be similar to the agent portal 150 of FIG. 1. The agent portal 280 may be configured to generate and provide an interface to the computing device of the agent. The agent portal 280 may communicate with the agent portal client on the computing device of the agent. The agent portal 280 may access the applications 235 and generate an interface that includes applications selected by the application selector 285. The agent portal 280 may provide that interface to the agent portal client, and the agent portal client may output the interface on a display of the computing device of the agent.

In the example of FIG. 1 and in stage D, the application selector 128 may automatically, and without receiving a request from the second user 108, select the account profile application 148. The application selector 128 may provide an indication to the agent portal of the selection of the account profile application 148. The agent portal 150 may automatically, and without receiving a request from the second user 108, generate an account profile interface 152 of the account profile application 148. The agent portal 150 may access the customer data 138 for the first user 102 and populate the various fields of the account profile application 148 and include the user data in the account profile interface 152. The agent portal client 154 may receive the account profile interface 152 and output the account profile interface 152 on the display of the computing device 110.

Figure 3:
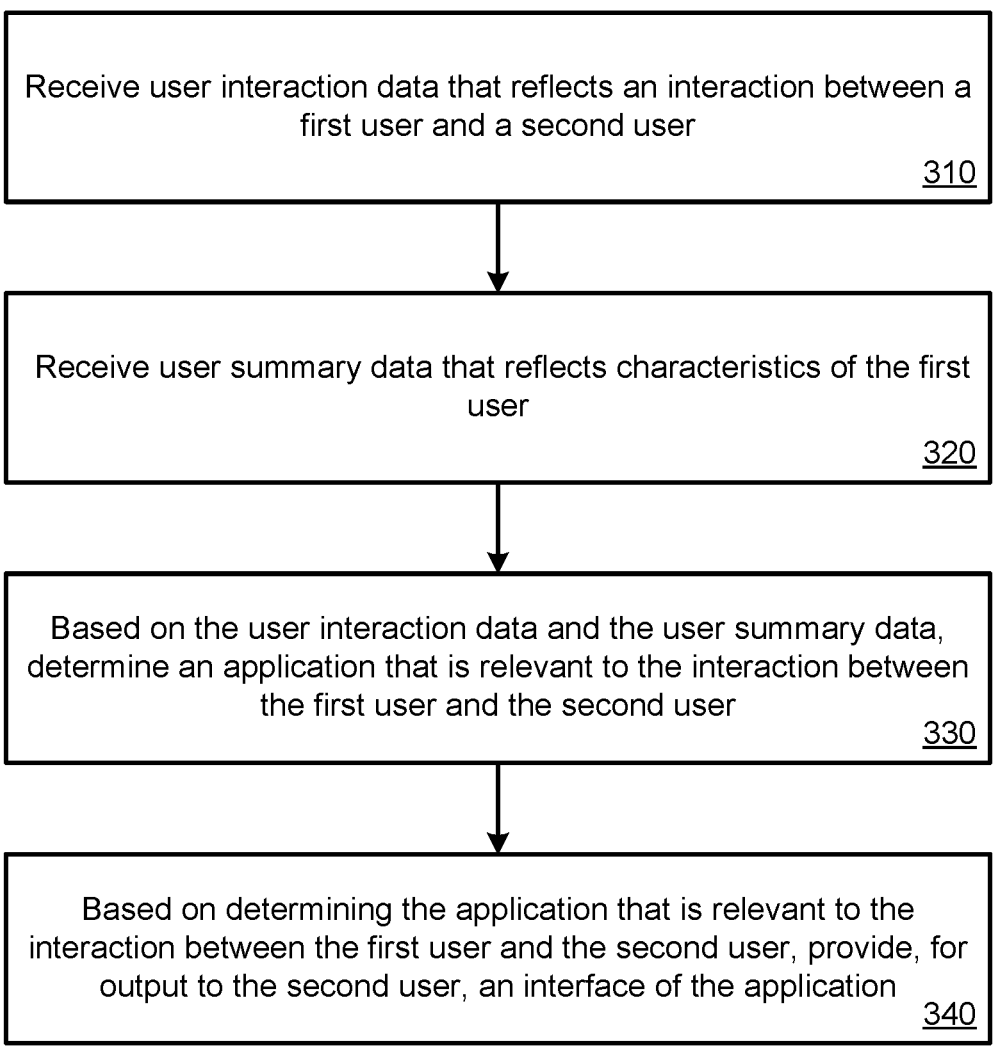
FIG. 3 is a flowchart of an example process for selecting software to present to a user based on an interaction between that user and another user.

FIG. 3 is a flowchart of an example process 300 for selecting software to present to a user based on an interaction between that user and another user. In general, the process 300 receives data related to the interaction and data related to the user. The process 300 selects an application that is relevant to the interaction to provide to the other user. The process 300 outputs an interface of the selected application to the other user. The process 300 will be described as being performed by the server 106 of FIG. 1 and will include references to other components in FIG. 1. In some implementations, the process 300 may be performed by the server 200 of FIG. 2.

The server 106 receives user interaction data 130 that reflects an interaction between a first user 102 and a second user 108 (310). In some implementations, the first user 102 may be a customer of an entity, such as a wireless carrier, and the second user 108 may be a customer service representative or customer service agent of the entity. The first user 102 and the second user 108 may be interacting using text-based communications, voice-based communications, video-based communications, and/or any other similar communication modality. The user interaction data 130 may include a transcription of the communications exchanged between the first user 102 and the second user 108. In some implementations, the user interaction data 130 may include data identifying a sentiment of the first user 102 and/or the second user 108. Some example sentiments may be angry, content, frustrated, and/or any other similar sentiments. The server 106 may determine the sentiments of the first user 102 and/or the second user 108 based on the characteristics of the voice of the first user 102 and/or the second user 108 and/or based on the word selection of the first user 102 and/or the second user 108.

The server 106 receives user summary data 144 that reflects characteristics of the first user (320). In some implementations, the user summary data 144 includes billing information of the first user 102, data identifying a type of device of the first user 102, wireless carrier service level information of the first user 102, or data of previous interactions between the first user 102 and additional users. The wireless carrier service level information may include that type of plan that the first user 102 subscribes to. The wireless carrier service level information may also include account information related to the first user 102.

In some implementations, the server 106 may be providing, for output the interface of an application. The server 106 may have automatically selected this application or the second user 108 have selected the application. The second user 108 may interact with the application through the computing device 110. The application may be configured to assist the second user 108 in the interaction with the first user 102. That interaction may generate agent action data 164. The agent action data 164 may indicate how the second user 108 is interacting with the application such as the cursor movement, cursor selections, keyboard strokes, eye movement, voice interaction, and/or any other similar interactions.

Based on the user interaction data 130 and the user summary data 144, the server 106 determines an application that is relevant to the interaction between the first user 102 and the second user 108 (330). In some implementations, the server 106 may provide the user interaction data 130, the user summary data 144, the agent action data 164, and the location data 136 as an input to a model. The server 106 may select the model based whether the server 106 has access to the user interaction data 130, the user summary data 144, the agent action data 164, or the location data 136. For example, if the server 106 does not have access to the agent action data 164, then the server 106 may select a model that is configured to receive the user interaction data 130, the user summary data 144, and the location data 136. The model may be configured output data indicating an application that is relevant to the interaction between the first user 102 and the second user 108.

The server 106 may use one or more rules to determine the application that is relevant to the interaction between the first user 102 and the second user 108. The one or more rules may specify how to compare the user interaction data 130, the user summary data 144, the agent action data 164, and/or the location data 136. Based on the comparison, the one or more rules indicates an application that is relevant to the interaction between the first user 102 and the second user 108.

In some implementations, the server 106 may use a combination of rules and models. The server 106 may determine whether there is a rule that specifies an application. If there is a rule that specifies an application, then the server 106 may not access the models. If there is not a rule that specifies an application, then the server 106 may access the models to identify an application. The server may determine an application based on one or more models. Based on the confidence score of the one or more models, the server 106 may determine whether to access the rules. If the confidence score is greater than an upper threshold, then the server 106 may not access the rules and select the application based on the output of the one or more models. If the confidence score is below a lower threshold, then the server 106 may access the rules and select the application based on the one or more rules. If the confidence score if between the upper and lower threshold, then the server 106 may access the rules and select the application from the one or more rules and the application from the one or more models.

The server 106 may train the model using machine learning and historical data. The historical data may include data related to previous interactions between other agents and customers. The data related to the previous interactions may include user interaction data, user summary data, agent action data, location data, and/or data related to the applications presented to the agent. The server 106 may also use the historical data to generate the rules. The server 106 may identify patterns in the historical data and determine which applications are usually being used by the agents when those patterns are present.

Based on determining the application that is relevant to the interaction between the first user and the second user, the server 106 provides, for output to the second user 108, an interface of the application (340). The server 106 may generate the interface using an agent portal 150. The agent portal 150 may interface with the agent portal client 154 of the computing device 110 and output the interface of the selected application to the agent portal client 154. The server 106 continue to receive additional user interaction data 130 as the interaction between the first user 102 and the second user 108 continues. The user summary data 144 may be updated, and the server 106 may receive the updated user summary data 144. The locations of the computing device 104 and/or the computing device 110 may change, and the server 106 may receive updated location data 136. The second user 108 may interact with the interface of the application, and the server 106 may receive additional agent action data 164. The server 106 may analyze the updated user summary data 144, the updated location data 136, the additional user interaction data 130, and/or the additional agent action data 164 using the rules and/or models. The server 106 may select an additional application to present to the second user 108. The additional application may also be relevant to the interaction between the first user 102 and the second user 108. This cycle may continue until the end of the interaction between the first user 102 and the second user 108.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    receiving, by a computing device, user interaction data that reflects an interaction between a first user and a second user and that includes a sentiment of the first user or the second user;
    receiving, by the computing device, user summary data that reflects characteristics of the first user;
    accessing, by the computing device, historical data that includes (i) previous user interaction data that reflects previous interactions between previous first users and previous second users and that includes previous sentiments of the previous first users or the previous second users, (ii) previous user summary data that reflects previous characteristics of the previous first users, and (iii) previous applications used by the previous second users during the previous interactions;
    generating, by the computing device, a model that is configured to receive given inputs that include (i) given user interaction data that reflects a given interaction between a given first user and a given second user and that includes a given sentiment of the given first user or the given second user and (ii) given user summary data that reflects given characteristics of the given first user and that is configured to output data identifying a given application that is relevant to the given interaction between the given first user and the given second user;
    training, by the computing device, the model using machine learning and that historical data that includes (i) the previous user interaction data that reflects the previous interactions between the previous first users and the previous second users and that includes the previous sentiments of the previous first users or the previous second users, (i) the previous user summary data that reflects the previous characteristics of the previous first users, and (iii) the previous applications used by the previous second users during the previous interactions;
    providing, as an input to the model, (i) the user interaction data that reflects the interaction between the first user and the second user and that includes the sentiment of the first user or the second user and (ii) the user summary data that reflects the characteristics of the first user;
    in response to providing, as the input to the model, (i) the user interaction data that reflects the interaction between the first user and the second user and that includes the sentiment of the first user or the second user and (ii) the user summary data that reflects the characteristics of the first user, receiving, from the model, an output that includes data identifying an application out of a plurality of previous applications that is relevant to the interaction between the first user and the second user; and
    based on receiving the data identifying the application that is relevant to the interaction between the first user and the second user, providing, for output to the second user, an interface of the application.

2. The method of claim 1, wherein the user summary data comprises billing information of the first user, data identifying a type of device of the first user, wireless carrier service level information of the first user, or data of previous interactions between the first user and additional users.

3. The method of claim 1, wherein the user interaction data comprises text-based or voice communications between the first user and the second user.

4. The method of claim 1, wherein the first user is a customer of a wireless carrier and the second user is a customer service representative of the wireless carrier.

5. The method of claim 1, comprising:
    after providing, for output to the second user, the interface of the application, receiving, by the computing device, additional user interaction data that reflects additional interaction between the first user and the second user;
    providing, as an additional input to the model, the additional user interaction data that reflects the additional interaction between the first user and the second user as an additional input to the model;

in response to providing, as the additional input to the model, the additional user interaction data that reflects the additional interaction between the first user and the second user as an additional input to the model, receiving, from the model, an additional output that includes data identifying an additional application that is relevant to the interaction between the first user and the second user; and based on receiving the data identifying the additional application, providing, for output to the second user, an interface of the additional application.

6. The method of claim 1, wherein the interface of the application is configured to provide the second user with information related to the first user.

7. The method of claim 1, comprising:
providing, for output to the second user, an additional application,
wherein determining the application that is relevant to the interaction between the first user and the second user is further based on the additional application.

8. The method of claim 7, wherein the interface of the application is configured to provide the second user with information related to the first user that is different than additional information provided by the additional application.

9. A system, comprising:
one or more processors; and
memory including a plurality of computer-executable components that are executable by the one or more processors to perform a plurality of acts, the plurality of acts comprising:
receiving user interaction data that reflects an interaction between a first user and a second user and that includes a sentiment of the first user or the second user;
receiving user summary data that reflects characteristics of the first user;
accessing historical data that includes (i) previous user interaction data that reflects previous interactions between previous first users and previous second users and that includes previous sentiments of the previous first users or the previous second users, (ii) previous user summary data that reflects previous characteristics of the previous first users, and (iii) previous applications used by the previous second users during the previous interactions;
generating a model that is configured to receive given inputs that include (i) given user interaction data that reflects a given interaction between a given first user and a given second user and that includes a given sentiment of the given first user or the given second user and (ii) given user summary data that reflects given characteristics of the given first user and that is configured to output data identifying a given application that is relevant to the given interaction between the given first user and the given second user;
training the model using machine learning and that historical data that includes (i) the previous user interaction data that reflects the previous interactions between the previous first users and the previous second users and that includes the previous sentiments of the previous first users or the previous second users, (i) the previous user summary data that reflects the previous characteristics of the previous first users, and (iii) the previous applications used by the previous second users during the previous interactions;
providing, as an input to the model, (i) the user interaction data that reflects the interaction between the first user and the second user and that includes the sentiment of the first user or the second user and (ii) the user summary data that reflects the characteristics of the first user;
in response to providing, as the input to the model, (i) the user interaction data that reflects the interaction between the first user and the second user and that includes the sentiment of the first user or the second user and (ii) the user summary data that reflects the characteristics of the first user, receiving, from the model, an output that includes data identifying an application out of a plurality of previous applications that is relevant to the interaction between the first user and the second user; and
based on receiving the data identifying the application that is relevant to the interaction between the first user and the second user, providing, for output to the second user, an interface of the application.

10. The system of claim 9, wherein:
the user summary data comprises billing information of the first user, data identifying a type of device of the first user, wireless carrier service level information of the first user, or data of previous interactions between the first user and additional users, and
the user interaction data comprises text-based or voice communications between the first user and the second user.

11. The system of claim 9, wherein the first user is a customer of a wireless carrier and the second user is a customer service representative of the wireless carrier.

12. The system of claim 9, wherein the plurality of acts comprise:
after providing, for output to the second user, the interface of the application, receiving additional user interaction data that reflects additional interaction between the first user and the second user;
providing the additional user interaction data that reflects the additional interaction between the first user and the second user as an additional input to the model
receiving, from the model, data identifying an additional application that is relevant to the interaction between the first user and the second user; and
based on receiving the data identifying the additional application, providing, for output to the second user, an interface of the additional application.

13. The system of claim 9, wherein the interface of the application is configured to provide the second user with information related to the first user.

14. The system of claim 9, wherein the plurality of acts comprise:
providing, for output to the second user, an additional application,
wherein determining the application that is relevant to the interaction between the first user and the second user is further based on the additional application.

15. One or more non-transitory computer-readable media storing computer-executable instructions that upon execution cause one or more computers to perform acts comprising:
receiving user interaction data that reflects an interaction between a first user and a second user and that includes a sentiment of the first user or the second user;

receiving user summary data that reflects characteristics of the first user;

accessing historical data that includes (i) previous user interaction data that reflects previous interactions between previous first users and previous second users and that includes previous sentiments of the previous first users or the previous second users, (ii) previous user summary data that reflects previous characteristics of the previous first users, and (iii) previous applications used by the previous second users during the previous interactions;

generating a model that is configured to receive given inputs that include (i) given user interaction data that reflects a given interaction between a given first user and a given second user and that includes a given sentiment of the given first user or the given second user and (ii) given user summary data that reflects given characteristics of the given first user and that is configured to output data identifying a given application that is relevant to the given interaction between the given first user and the given second user;

training the model using machine learning and that historical data that includes (i) the previous user interaction data that reflects the previous interactions between the previous first users and the previous second users and that includes the previous sentiments of the previous first users or the previous second users, (i) the previous user summary data that reflects the previous characteristics of the previous first users, and (iii) the previous applications used by the previous second users during the previous interactions;

providing, as an input to the model, (i) the user interaction data that reflects the interaction between the first user and the second user and that includes the sentiment of the first user or the second user and (ii) the user summary data that reflects the characteristics of the first user;

in response to providing, as the input to the model, (i) the user interaction data that reflects the interaction between the first user and the second user and that includes the sentiment of the first user or the second user and (ii) the user summary data that reflects the characteristics of the first user, receiving, from the model, an output that includes data identifying an application out of a plurality of previous applications that is relevant to the interaction between the first user and the second user; and based on receiving the data identifying the application that is relevant to the interaction between the first user and the second user, providing, for output to the second user, an interface of the application.

* * * * *